US012670124B2

(12) United States Patent
Lampert et al.

(10) Patent No.: US 12,670,124 B2
(45) Date of Patent: Jun. 30, 2026

(54) TAG-BASED ENFORCEMENT OF OBJECT STORAGE POLICIES ACROSS TENANTS OF AN OBJECT STORAGE SYSTEM

(71) Applicant: NetApp, Inc., San Jose, CA (US)

(72) Inventors: Markus Lampert, New Westminster (CA); Jessica Henry, Vancouver (CA); Benjamin Zulanch, Cary, NC (US); William Zhang, Coquitlam (CA)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/424,504

(22) Filed: Jan. 26, 2024

(65) Prior Publication Data

US 2025/0245190 A1     Jul. 31, 2025

(51) Int. Cl.
*G06F 16/11*          (2019.01)
*G06F 16/16*          (2019.01)
*G06F 16/185*         (2019.01)

(52) U.S. Cl.
CPC .......... *G06F 16/113* (2019.01); *G06F 16/168* (2019.01); *G06F 16/185* (2019.01)

(58) Field of Classification Search
USPC ......................................................... 707/609
See application file for complete search history.

(56) References Cited

U.S. PATENT DOCUMENTS

| | | | |
|---|---|---|---|
| 10,721,141 B1 * | 7/2020 | Verma .................. | H04L 41/0893 |
| 2008/0263627 A1 * | 10/2008 | Berteau ............... | G06F 21/6263 |
| | | | 726/1 |
| 2009/0164527 A1 * | 6/2009 | Spektor .................... | G06F 16/00 |
| 2017/0093913 A1 * | 3/2017 | Summers .............. | H04L 63/105 |
| 2018/0293024 A1 * | 10/2018 | Baptist .................. | G06F 3/0659 |
| 2018/0356989 A1 * | 12/2018 | Meister ................... | G06F 3/062 |

* cited by examiner

*Primary Examiner* — Yu Zhao

(57) ABSTRACT

The technology disclosed herein enables enforcement of Information Lifecycle Management (ILM) policies across tenants in an object storage system using tags associated with the ILM policies. In a particular example, a method includes identifying ILM policies for an object storage system having multiple tenants and associating respective tags with the ILM policies. The method further includes enabling a subset of the tags to be assigned to data objects of a tenant of the multiple tenants and enforcing a portion of the ILM policies on the data objects, wherein the portion of the ILM policies corresponds to tags of the subset assigned to the data objects.

21 Claims, 14 Drawing Sheets

200

COMPUTING SYSTEM 1200

COMMUNICATION INTERFACE 1260

OBJECT STORAGE 1230

STORAGE SYSTEM 1245

PROCESSING SYSTEM 1250

TAG-BASED ENFORCEMENT OF OBJECT STORAGE POLICIES ACROSS TENANTS OF AN OBJECT STORAGE SYSTEM

TECHNICAL FIELD

Information Lifecycle Management (ILM) policy enforcement on objects stored in an object storage system.

BACKGROUND

Information Lifecycle Management (ILM) policies exist for managing the lifecycle of objects and buckets stored in an object storage system. ILM policies are used to define the rules for how long objects should be retained, where they should be stored, and how they should be protected. These policies are used to ensure that data is stored in a cost-effective manner while still meeting an organization's data retention and protection requirements.

Some ILM policies may be used to define rules for object protection and retention requirements. For example, ILM rules can be defined to copy object data to two physical storage sites, or to use an erasure coding profile and an S3 bucket to determine where and how long the object is stored. The rules can be configured to meet the specific needs of the organization and can be simulated before activation to ensure that they will work as intended to protect content from loss.

In practice, most ILM policies are simple, even though the object storage system allows for the design of sophisticated and complex ILM policies. An example ILM policy may include ILM rules such as storing all objects belonging to the S3 bucket named finance-records in a storage pool that contains three sites using 6+3 erasure coding. If an object does not match the first ILM rule, then subsequent rules are checked in order. If none of the rules match, the policy's default ILM rule, Two Copies Two Data Centers, may be used instead to store one copy of that object in Site 1, and one copy in Site 2.

In addition to ILM policies, object storage systems also have the concept of tenants. A tenant is a logical container that holds a set of objects and buckets. Tenants are used to separate, and provide isolation between, different groups of users or applications. Each tenant has its own set of policies, and objects and buckets can only be accessed by users or applications that belong to the same tenant. Each tenant may implement its own ILM policies independently of other tenants of the object storage system.

SUMMARY

The technology disclosed herein enables enforcement of Information Lifecycle Management (ILM) policies across tenants in an object storage system using tags associated with the ILM policies. In a particular example, a method includes identifying ILM policies for an object storage system having multiple tenants and associating respective tags with the ILM policies. The method further includes enabling a subset of the tags to be assigned to data objects of a tenant of the multiple tenants and enforcing a portion of the ILM policies on the data objects, wherein the portion of the ILM policies corresponds to tags of the subset assigned to the data objects.

In other examples, an apparatus performs steps similar to those in the above-recited method and computer readable storage media directs a processing system to perform the similar steps.

DETAILED DESCRIPTION

Figure 1:
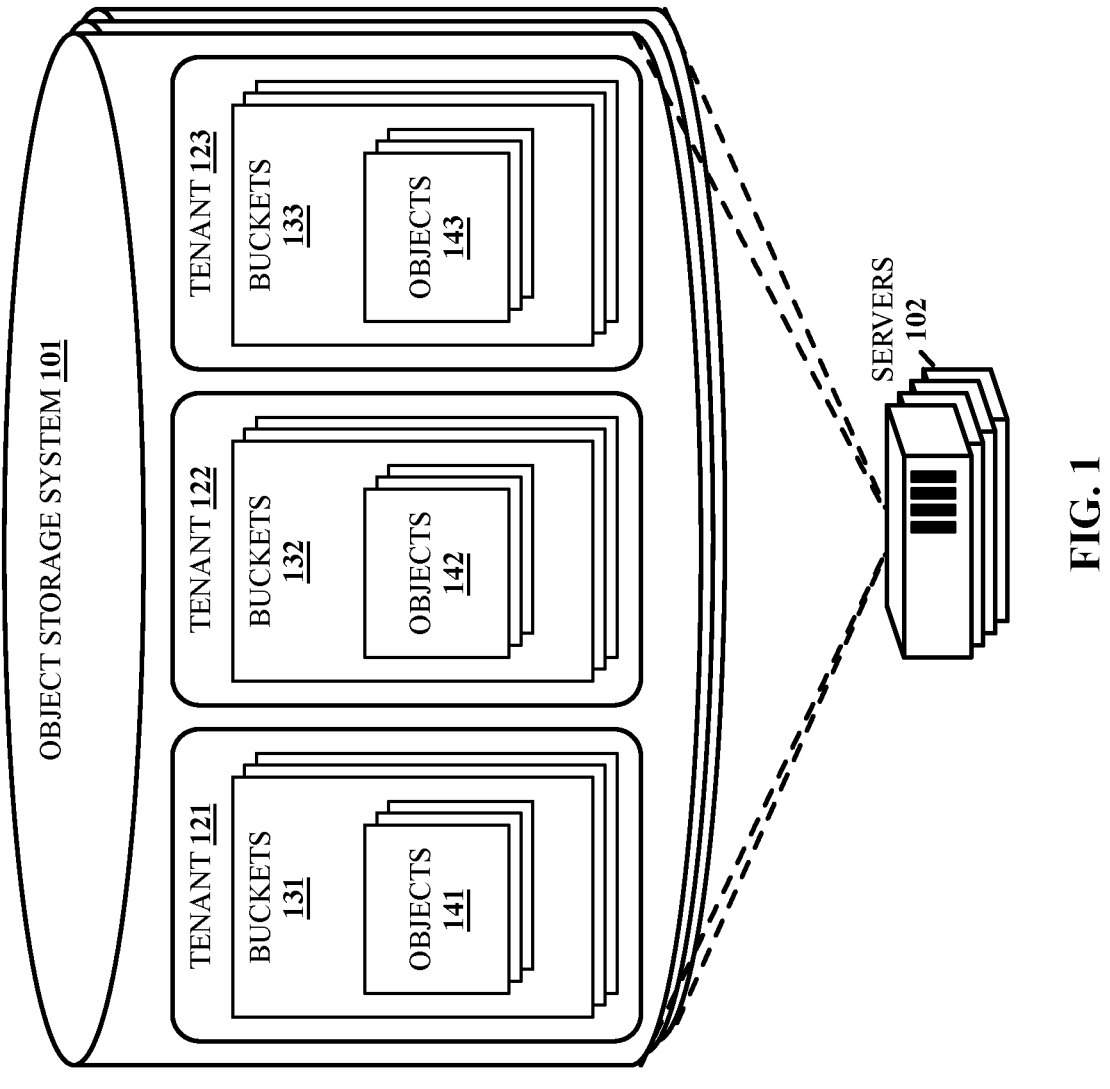
FIG. 1 illustrates an implementation for enforcing ILM policies based on tags in a multi-tenant object storage system.

An object storage system is a data storage architecture that manages data as objects, as opposed to other storage architectures that manage data as files or blocks. Object storage systems are used to store large amounts of unstructured data, such as documents, photos, videos, and audio files. Information Lifecycle Management (ILM) policies are used to manage the lifecycle of objects in an object storage system. ILM policies define how long objects should be retained, where they should be stored, and how they should be protected.

In an object storage system, data is organized into buckets and objects. Buckets are containers that hold objects, similar to folders in a file system. Objects are the basic units of storage in an object storage system. Each object consists of data, metadata, and a unique identifier. The data is the actual content being stored, such as a photo or video. The metadata is information about the object, such as its creation date, size, and content type. The unique identifier is used to locate and access the object. When data is stored in an object storage system, it is broken up into smaller pieces called chunks. These chunks are then distributed across multiple storage devices, which can be located in different geographic locations. This distribution of data across multiple devices is known as data sharding. By distributing data across multiple devices, object storage systems can provide high levels of availability and durability. If one storage device fails, the data can be retrieved from another device. Object storage systems are used by organizations to store and manage large amounts of data in a cost-effective and scalable manner.

The technology implemented in the object storage systems described below enforce object storage policies using corresponding tags. Tags are each associated with an ILM policy. When a data object is assigned a particular tag, the ILM policy associated with that tag is enforced on the object. By using tags to enforce ILM policies, the object storage system and its administrator can more efficiently manage the lifecycle of objects, reducing the amount of time and resources required to manage data. Moreover, the tags enable different tenants to be authorized to use different storage policies. For instance, one tenant may pay to use a particular policy while another tenant may not. The tag associated with the policy would be available to the paying tenant and not the non-paying tenant. By using tags to enforce ILM policies, the object storage systems provide a way to automate the management of data in an object storage system, reducing the risk of human error when assigning policies and ensuring that data is managed in accordance with organizational policies.

Various embodiments of the present technology provide for a wide range of technical effects, advantages, and/or improvements to computing systems and components. For example, various embodiments may include one or more of the following technical effects, advantages, and/or improvements: 1) the object storage system enables improved determination for which ILM policies should be enforced on which data objects using the tags assigned to the data storage objects; 2) the object storage system improves a user experience when changing ILM policies enforced on data objects because the policy can be changed across storage objects by changing the policy associated with a tag assigned to the storage objects; 3) the object storage system limits which ILM policies can be used on data objects of particular tenants of the object storage system by supplying only those tags associated with allowed policies to the tenant; and/or 4) the object storage system prevents tenants from applying tags to data objects of other tenants.

FIG. 1 illustrates implementation 100 for enforcing ILM policies based on tags in a multi-tenant object storage system. Implementation 100 includes object storage system 101, which is a distributed object storage system hosted by storage servers 102. In other examples, the object storage system may be hosted by a single storage server or may be located on some other type of computing system. In this example, the entity running object storage system 101 has divided object storage system 101 across three different tenants 121-123, although, other examples may divide object storage system 101 among more or fewer tenants. A tenant is a logical entity that represents a particular user or group of users or applications that share the same storage repository. The data objects stored by tenants 121-123 are, therefore, logically separated even though they are stored in the same object storage system.

Specifically, each of tenants 121-123 stores respective data objects 141-143 in respective buckets 131-133. A data bucket in an object storage system is a container for storing data objects, which are the basic units of data in the system. Buckets are associated with the respective tenants 121-123 using a globally unique identifier associated with the tenant. Although not shown, a tenant's computing system may communicate with object storage system 101 via Application Programming Interfaces (APIs) provided by object storage system 101. The native API for object storage is an HTTP-based RESTful API (also known as a RESTful Web service) other APIs, such as StorageGRID REST or Amazon S3, build on the native API to enhance functionality. These APIs query an object's metadata to locate the desired object via a network, such as the Internet, on one of storage servers 102. The tenant's computing system can use these APIs to retrieve data from and store data in a data bucket as a data object.

ILM policies are used to manage the lifecycle of data objects 141-143 in object storage system 101. ILM policies may define how long respective objects of data objects 141-143 should be retained, where they should be stored, and how they should be protected. For example, one ILM policy may require a data object be stored for one month while another may require a data object be stored for one year. In another example, one ILM policy may indicate data should use a 6+3 Erasure Coding (EC) policy for protection while another ILM policy may duplicate copies of the object between sites. Which policies are used for which data objects are defined in object storage system 101 using tags corresponding to the respective policies. For instance, a tag labeled "Red" may correspond to the ILM policy for deleting data objects after one month in the above example while a tag labeled "Green" may correspond to the ILM policy for deleting data objects after a year. The tags enable object storage system 101 and its administrators to clearly determine which policies apply to which objects.

The tags also enable policies to be changed in bulk. For example, if an administrator determines that data objects being stored for one month in accordance with the Red tag only need to be stored for two weeks, the administrator can modify the policy associated with the Red tag to delete data objects after two weeks rather than a full month. The administrator does not need to retag or otherwise update every single data object having the Red tag. Multiple tags may also be associated with the same ILM policy. For instance, in the previous example, the administrator may determine that data objects being stored for one month in accordance with the Red tag should be stored for an entire year instead. The Red tag may be updated to be associated with the same one-year retention ILM policy as the Green tag. A benefit of maintaining two tags means that the data objects assigned the red tag can still be updated independently. For instance, the red tag may later be changed to associated with a two-year retention ILM policy. Had the data objects tagged with the Red tag been changed to the green tag rather than updating the Red tag's ILM policy, the data object associated with the Green tag would have to be sorted into those objects that should still have the Green tag and those objects that should be tagged with a new Red tag (i.e., a Red tag associated with a two-year retention policy rather than one year). It should be understood tags may be assigned to a bucket containing data objects to assign the tags to the data objects. In some cases, it may be possible to assign tags to data objects directly.

Figure 2:
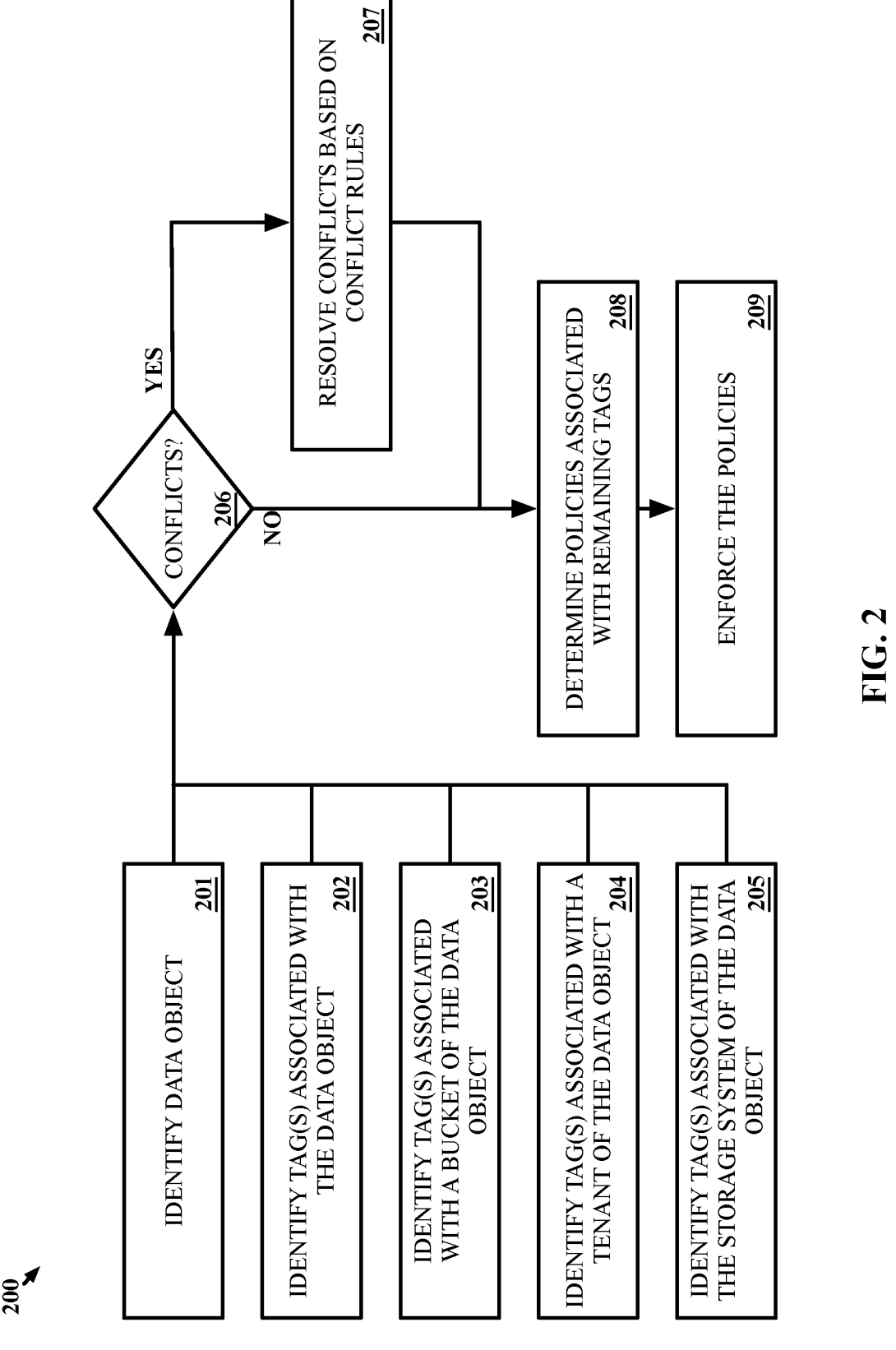
FIG. 2 illustrates an operation to enforce ILM policies based on tags in a multi-tenant object storage system.

FIG. 2 illustrates operation 200 to enforce ILM policies based on tags in a multi-tenant object storage system. Operation 200 describes how object storage system 101 may determine which ILM policies should be enforced on an identified data object (step 201). The data object may already be stored in object storage system 101 or may be in process of being stored (e.g., when a tenant stores data to object storage system 101 the data protection policy for the data may be implemented during the write process). Object storage system 101 identifies whether any tags are associated with the data object itself (step 202), with the data bucket in which the object is stored (step 203), with a tenant of the data object (step 204), and with object storage system 101 as a whole (step 205).

As implied by steps 202-205, tags may be applied at different levels of object storage system 101, which may create a hierarchy of ILM policies. For example, a tag may be assigned to the identified data object while another tag may be assigned to a bucket into which the data object should be stored. This may cause conflicts between tags at different levels in the hierarchy. In the above example, the tag at the bucket level may be associated with one length of time for data retention while the tag at the object level may indicate a different length of time. Object storage system 101 may have rules in place for handling conflicts between tags at different levels. In one example, the rules may indicate that the more robust of the two ILM policies associated with the conflicting tags should be used. The tag having the longer length of time for data retention may, therefore, win out in the above example since object storage system 101 would want to err on the side of not deleting data. In another example where two data protection policies are in conflict, the rules may indicate that the policy resulting in greater data protection should be used for the data object. In a further example, the level in which a tag is applied may indicate the tag that controls. For instance, when one tag is assigned at the object level and another tag is assigned at the bucket level, a rule may indicate that the object level tag controls over the higher-level bucket tag. When object storage system 101 identifies conflicts between tags (step 206), object storage system 101 resolves the conflicts based on the rules before implementing the policies (step 207).

After the conflict resolution (if needed), object storage system 101 determines the policies associated with the remaining tags (step 208). Those remaining policies are what object storage system 101 enforces on the data object (step 209). In some examples, when no tag is assigned to a lower level (e.g., to a bucket and/or data objects therein), then object storage system 101 applies the policies tagged at a higher level. For example, a tag may be assigned to tenant 122 but not to one of buckets 132 and those of data objects 142 stored therein. Object storage system 101 would enforce the ILM policy assigned to tenant 122 for the objects stored in that bucket. Also, in some examples, no tag may be assigned that is associated with a certain type of ILM policy (e.g., retention, protection, etc.). In those examples, a policy associated with a default tag may be enforced. The policy may be associated with a default tag that is automatically assigned when another tag is not assigned to override it.

Figure 3:
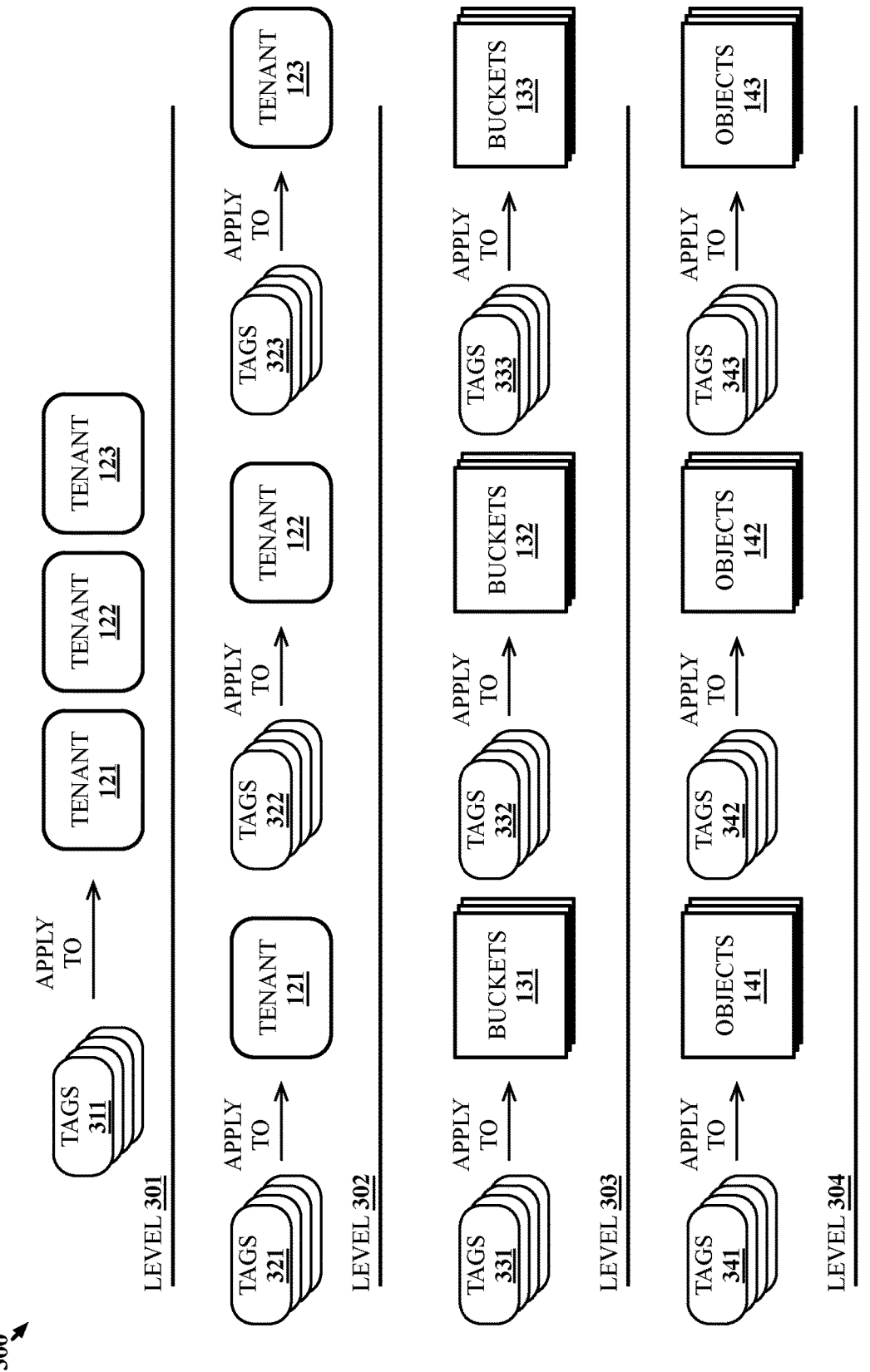
FIG. 3 illustrates an operational scenario for enforcing ILM policies based on tags in a multi-tenant object storage system.

FIG. 3 illustrates an operational scenario 300 for enforcing ILM policies based on tags in a multi-tenant object storage system. Operational scenario 300 illustrates four hierarchal levels 301-304 to which tags may be applied in an example. Other examples may use more or fewer levels. The tags may be different at the different levels and across different tenants. Tags 311 apply to tenant 123 if assigned by an administrator of object storage system 101. Tags 321-323 apply to respective ones of tenants 121-123 if assigned by their respective tenants 121-123. Tags 331-333 apply to respective buckets 131-133 of tenants 121-123 if assigned and tags 341-343 apply to respective data objects 141-143 within buckets 131-133 if assigned.

Tags at a lower level may be a subset of tags at a higher level. For example, tags 311 at level 301 may include all possible tags that may be assigned within object storage system 101. Tags 321-323 at level two may include all or only a subset of tags 311 and as similar situation may exist when moving down to level 303 and level 304. The different tag sets in a level need not include the same tags either. For example, tags 321 may not include the same tags as tags 322. It is also possible in some examples that a lower level may include tags not included in a higher level. For example, if tenant 123 desires a particular ILM policy that the administrator of object storage system 101 did not implement, then the tenant may create a tag to associate with that ILM policy for inclusion in tags 323 (or the administrator of object storage system 101 may create the tag for tenant 123).

Figure 4A:
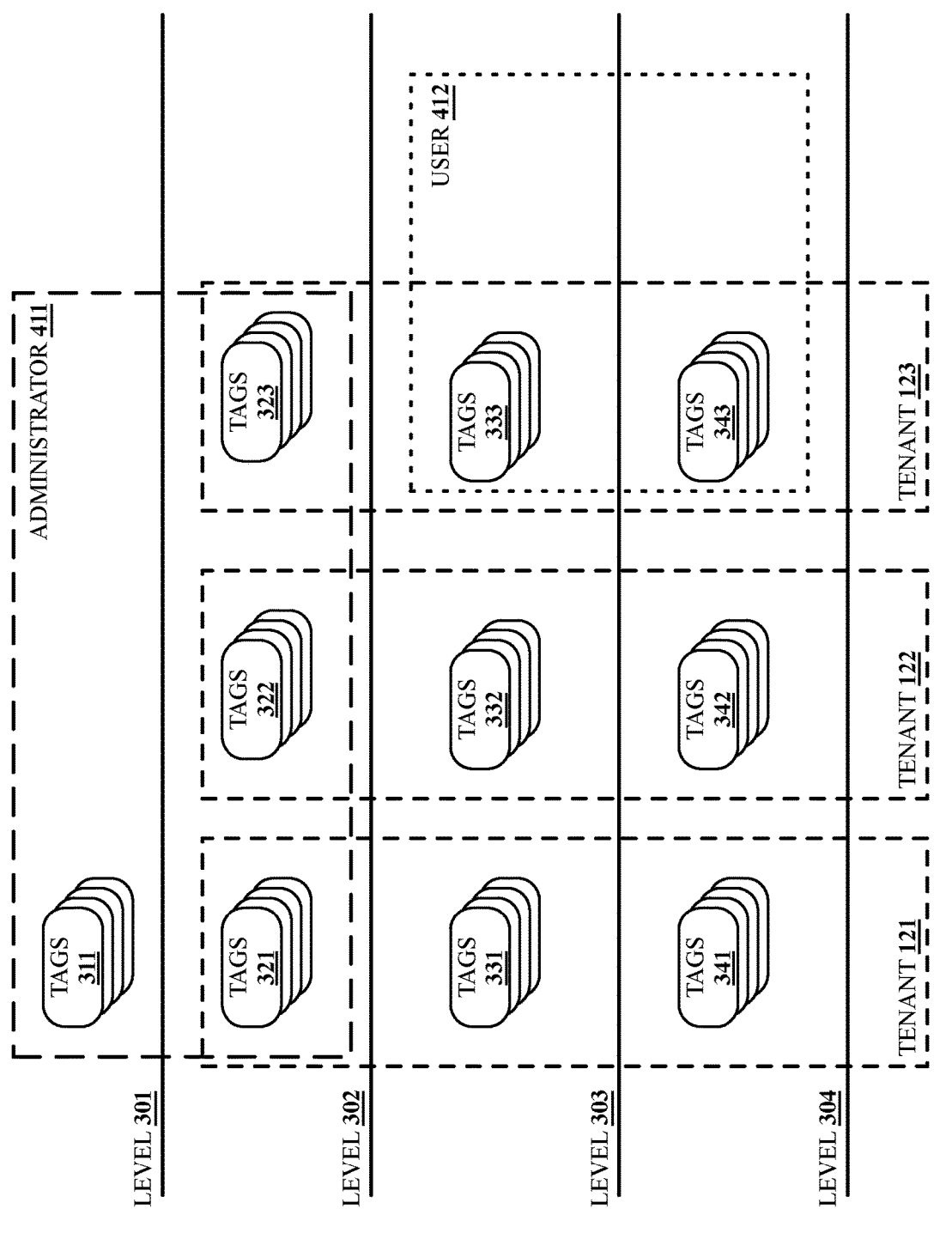
FIGS. 4A-C illustrate operational scenarios for enforcing ILM policies based on tags in a multi-tenant object storage system.
Figure 4B:
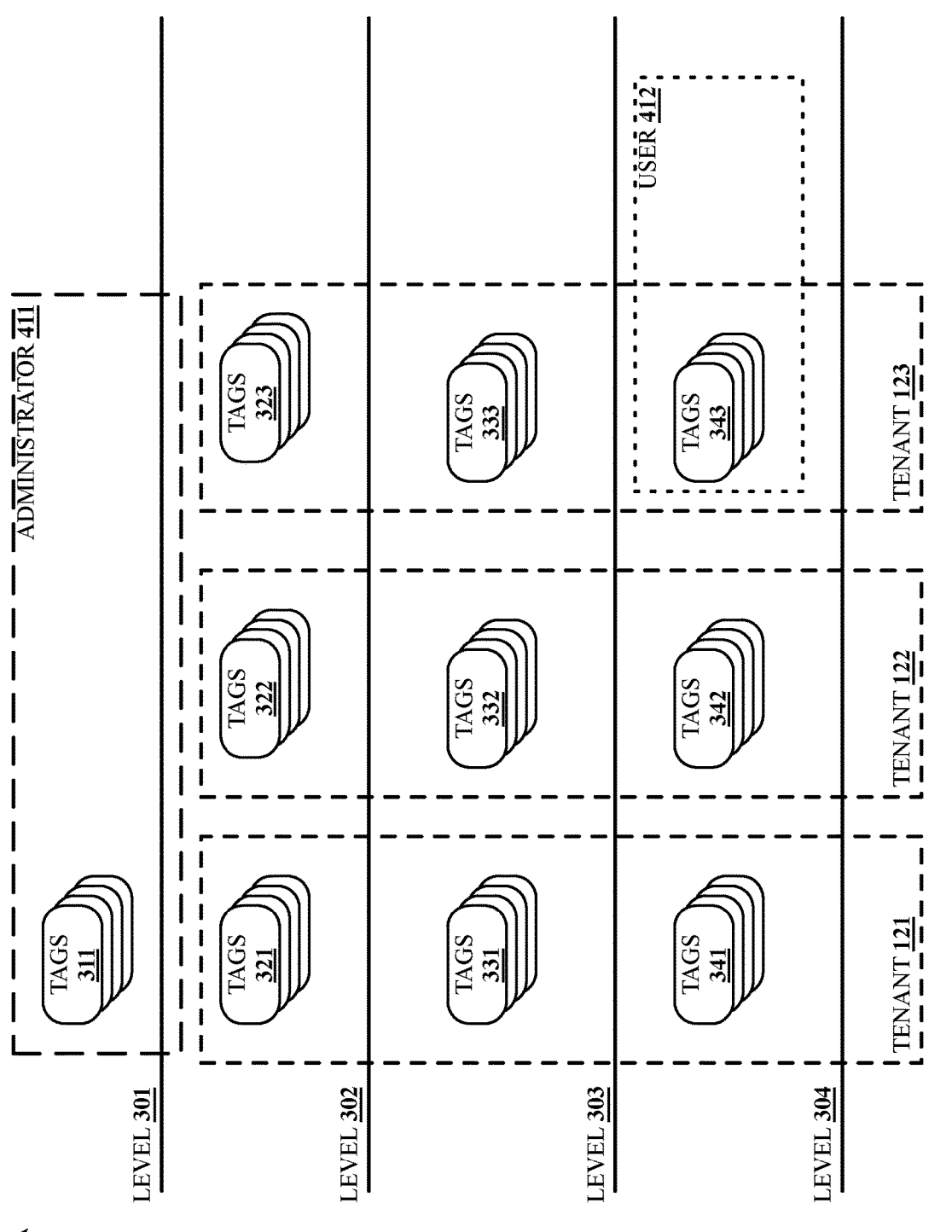
Figure 4C:
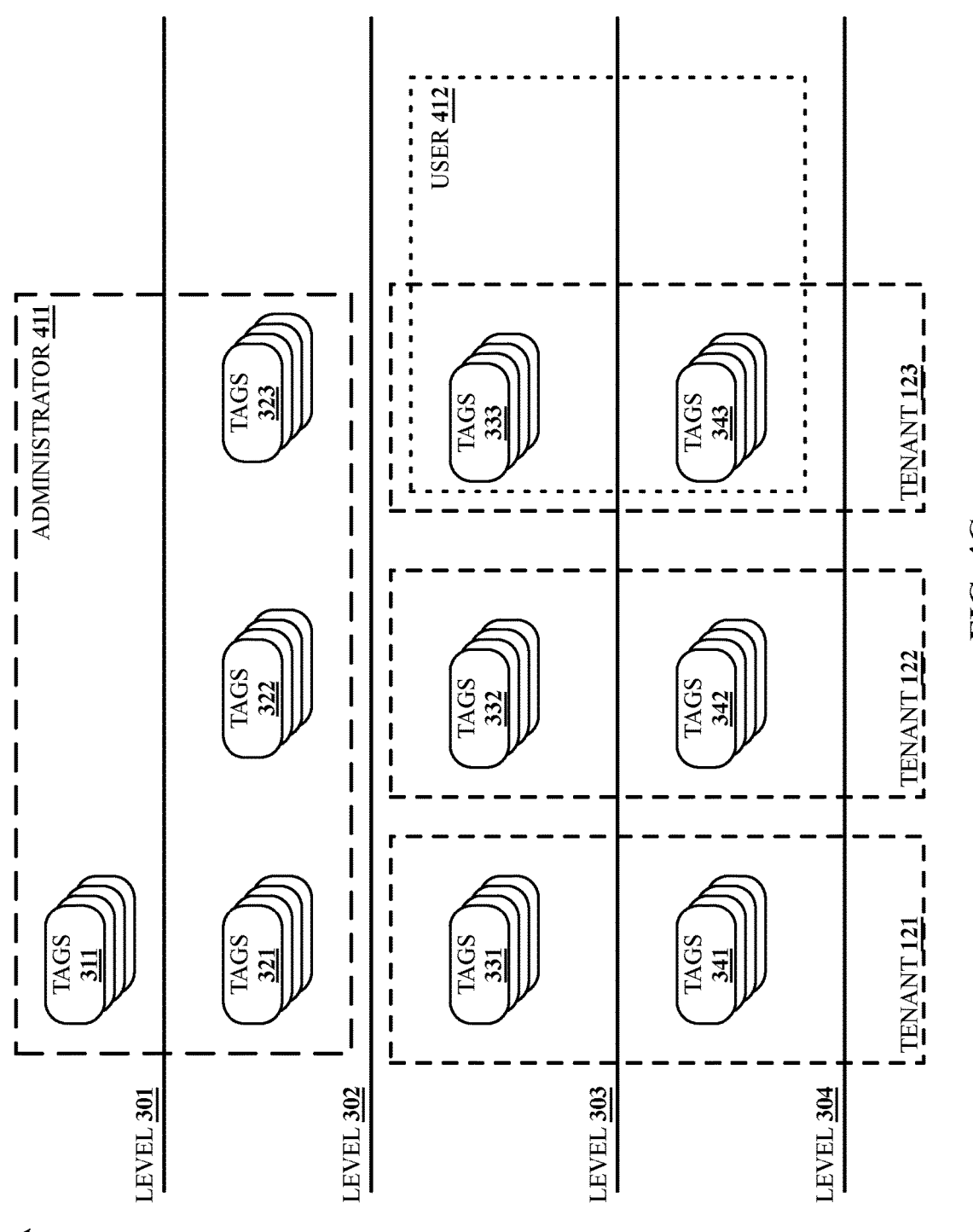

FIGS. 4A-C illustrate operational scenarios 400-402 for enforcing ILM policies based on tags in a multi-tenant object storage system. Operational scenario 400-402 are examples showing how different entities can access different tags for assignment within object storage system 101. In operational scenario 400 of FIG. 4A, administrator 411 has control over tags 311 at level 1 and tags 321-323 at level 2. Administrator 411 is an administrative user responsible for object storage system 101. For example, administrator 411 may be an employee of the entity operating object storage system 101 to supply object storage services to tenants 121-123. In some examples, administrator 411 may be the only one with permissions or capability to assign tags throughout object storage system 101. A tenant would, therefore, request a tag assignment or change from administrator 411. In operational scenario 400, tenants 121-123 have control over the tags at levels 302-304 associated with respective ones of tenants 121-123. Thus, tenant 121 has control over assigning tags 321, 331, and 341, tenant 122 has control over assigning tags 322, 332, and 342, and tenant 123 has control over assigning tags 323, 333, and 343. A user associated with each of tenants 121-123 may be charged with assigning tags to ensure data objects are maintained in object storage system 101 as desired by the tenant's organization. The user within a tenant may be granted permission to assign tags throughout the tenant's storage or may only be allowed to assign tags to specific portions (e.g., specific buckets or objects).

Different users associated with a tenant may receive different permissions. For example, in operational scenario 400, user 412 of tenant 123 may receive permissions to assign tags 333 to one or more specific buckets in buckets 133 and assign tags 343 to objects in those buckets. User 412 may not have permissions to assign tags to other buckets or objects. For instance, user 412 may be in the human resources department of tenant 123 and may be granted permission to control ILM policies for that department's data. User 412 may not be granted permission to control ILM policies for data of other departments.

Operational scenario 401 in FIG. 4B describes another possible arrangement for tagging permissions. In this example, administrator 411 has control over tags 311 at level 301 but not tags 321-323 at level 2. Level 2 permissions are reserved for the respective tenants 121-123. Also, in operational scenario 401, user 412 is provided with permissions to apply tags 343 to one or more specific objects. User 412 does not have permissions to assign tags 333 to buckets at level 303.

Operational scenario 402 in FIG. 4C describes a further tagging permissions arrangement. In operational scenario 402, administrator 411 has the power to assign tags at both level 301 and level 302 while not even tenants 121-123 are able to assign tags at level 302. Such an arrangement may prevent a tenant from assigning tags that affect data objects tenant wide. The tenant may, therefore, need to put more thought into whether a tag should apply to a specific bucket at level 303 rather than applying a blanket tag across all buckets at level 302. While operational scenarios 400-402 show a few examples of how permissions may be arranged for tenants 121-123 and administrator 411, other arrangements may also be used-including combinations of the arrangements in operational scenarios 400-402 across different tenants.

Figure 5:
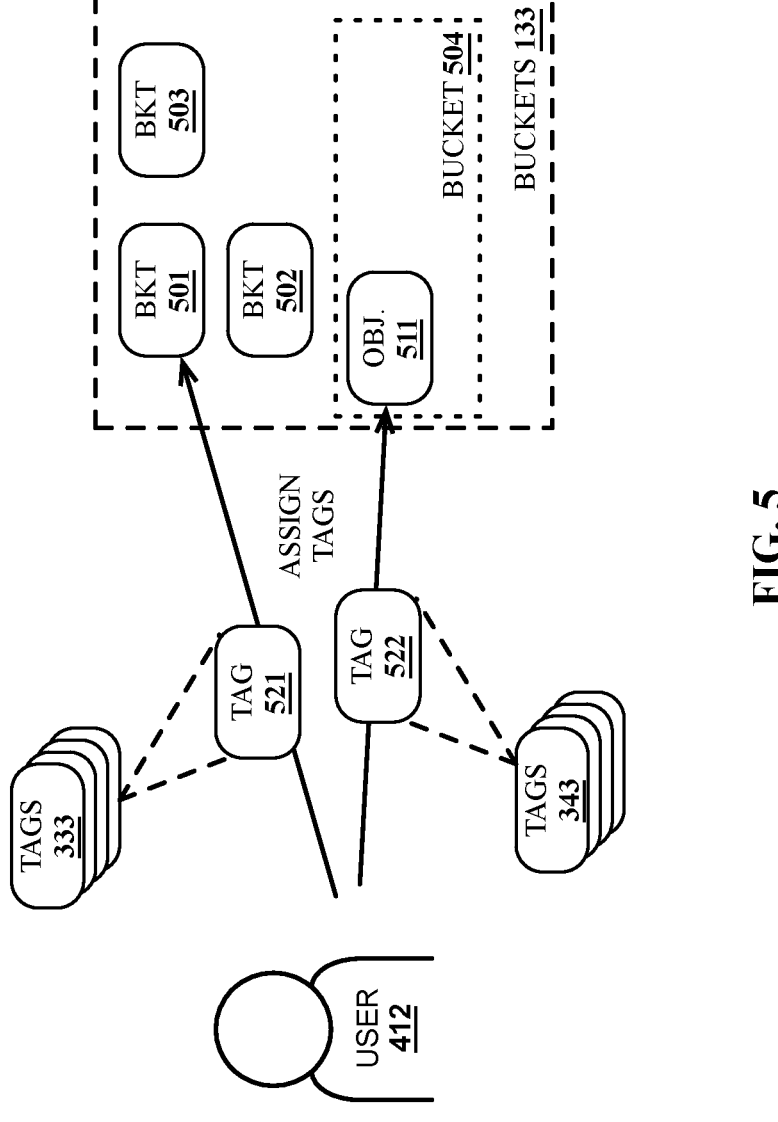
FIG. 5 illustrates an operational scenario for enforcing ILM policies based on tags in a multi-tenant object storage system.

FIG. 5 illustrates operational scenario 500 for enforcing ILM policies based on tags in a multi-tenant object storage system. Operational scenario 500 is an example for how user 412 may assign tags. In this case, user 412 has the appropriate permissions to assign tags to buckets 501-503 as a whole and data object 511 within bucket 504. Since user 412 is associated with tenant 123, buckets 501-504 are included in buckets 133 of tenant 123. Similarly, data object 511 is included in data objects 143 of tenant 123. In this example, user 412 assigns tag 521 of tags 333 to bucket 501 and assigns tag 522 of tags 343 to data object 511. Tag 521 and tag 522 may be the same tag and, therefore, may be associated with the same ILM policy or may be different tags.

After the assignment occurs, when object storage system 101 enforces ILM policies, object storage system 101 enforces the ILM policy associated with tag 521 on data objects within bucket 501 and enforce the ILM policy associated with tag 522 on data object 511 assuming object storage system 101 did not identify any conflicts.

Figure 6:
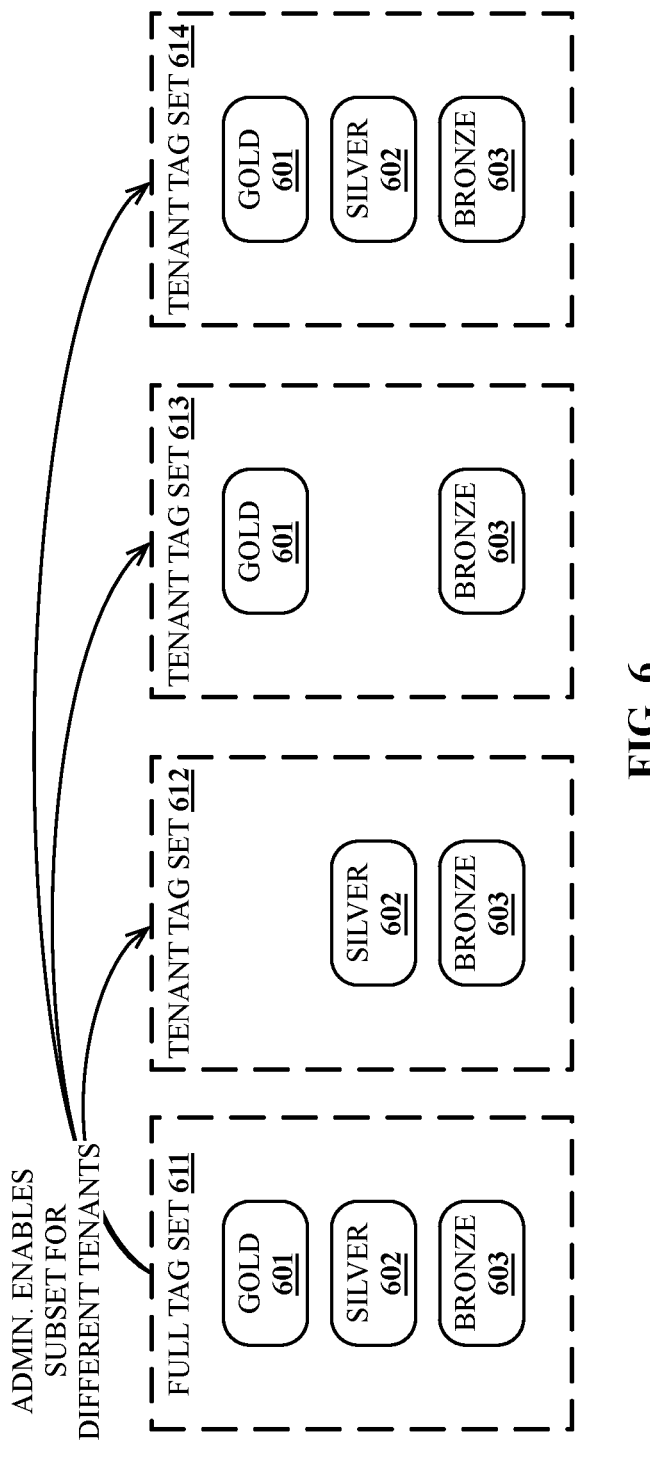
FIG. 6 illustrates an operational scenario for enforcing ILM policies based on tags in a multi-tenant object storage system.

FIG. 6 illustrates operational scenario 600 for enforcing ILM policies based on tags in a multi-tenant object storage system. Operational scenario 600 is an example of how tags associated with ILM policies may be distributed to tenants 121-123. In this example, administrator 411 has control over all tags in object storage system 101. All the tags include tags 601-603, labeled Gold, Silver, and Bronze, in full tag set 611. Each of tenant tag sets 612-614 include at least a subset of tags 601-603, as enabled by administrator 411. Tenant tag set 612 for tenant 121 includes silver tag 602 and Bronze tag 603. Tenant tag set 613 for tenant 122 includes Gold tag 601 and Bronze tag 603. Tenant tag set 614 for tenant 123 includes Gold tag 601, silver tag 602, and Bronze tag 603. In this example, tenant tag set 614 may include all of tags 601-603 because tenant 123 pays for a level of service from object storage system 101 that includes all of the ILM policies associated with tags 601-603.

Figure 7:
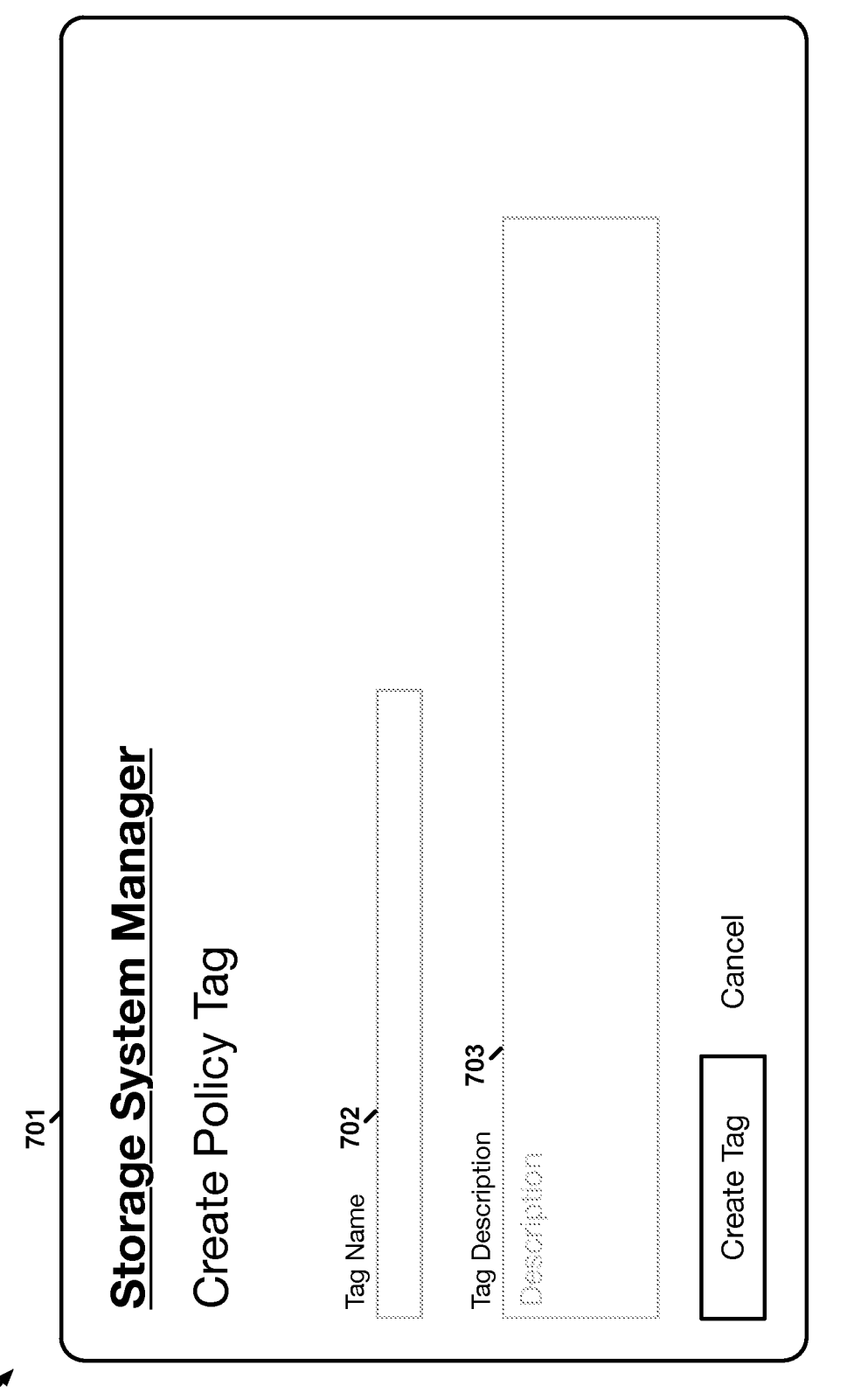
FIG. 7 illustrates a user interface to enforce ILM policies based on tags in a multi-tenant object storage system.

FIG. 7 illustrates user interface 700 to enforce ILM policies based on tags in a multi-tenant object storage system. User interface 700 includes window 701, which is an example interface of a user system for administrator 411 to create tags for assignment by administrator 411 or tenants 121-123 depending on whether the created tag is available to tenants 121-123 (e.g., depending on inclusion in tenant tag sets 612-614). Administrator 411 can input the desired tag name/label (e.g., Gold, Silver, or Bronze) into text entry field 702 and may write a plain language description of the tag in text entry field 703. When administrator 411 is satisfied with their entries, administrator 411 can choose to create tag. Administrator 411 also has the option to cancel tag creation if so desired.

In other examples, a tenant may be allowed to create tags for use on their buckets and data objects without relying on administrator 411 to do so. For example, tenant 121 may create a tag labeled Blue and associates the Blue tag with a particular ILM policy. Since the Blue tag was created by tenant 121, it may be available for use in tenant tag set 612 but not in tenant tag set 613 or tenant tag set 614.

Figure 8:
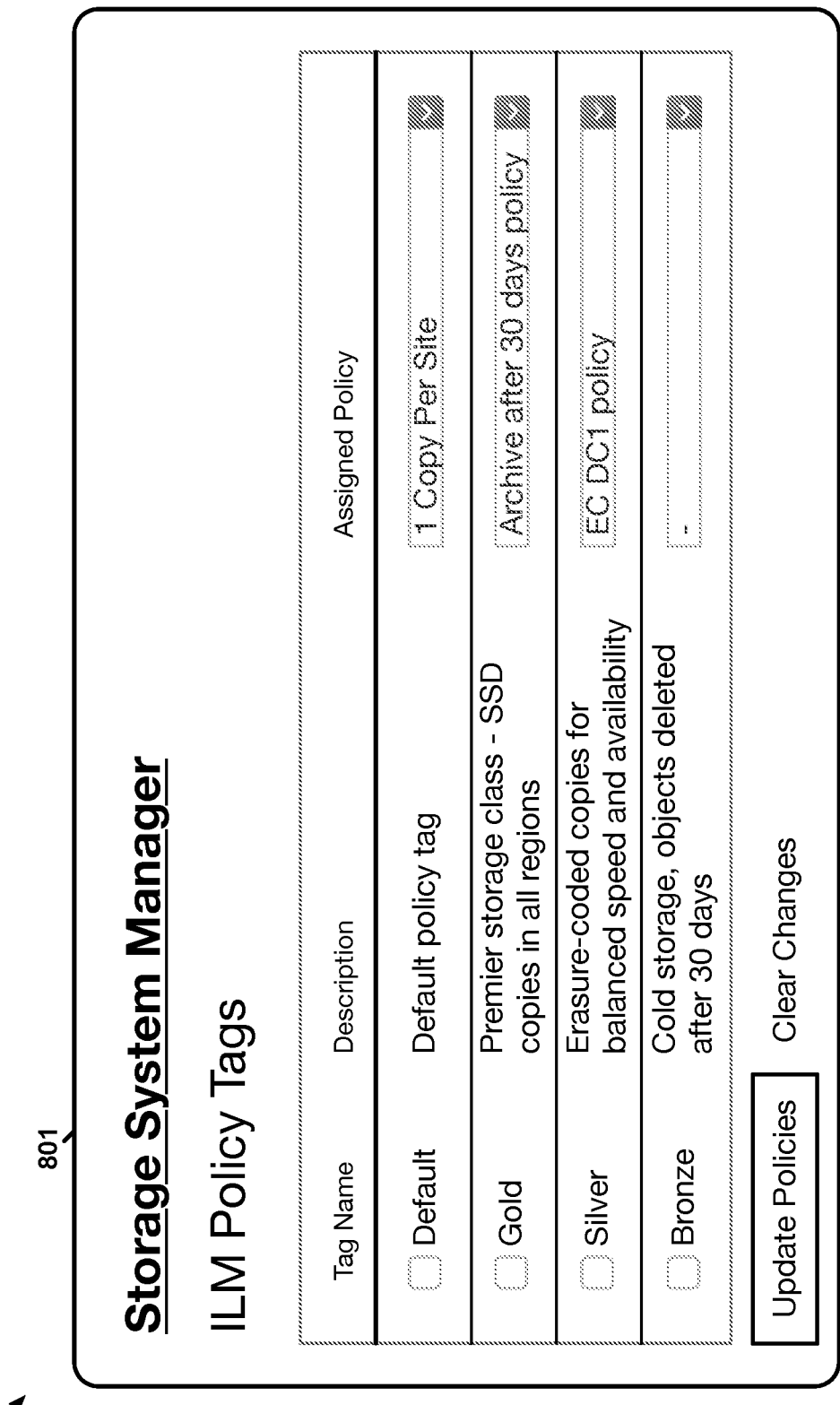
FIG. 8 illustrates a user interface to enforce ILM policies based on tags in a multi-tenant object storage system.

FIG. 8 illustrates user interface 800 to enforce ILM policies based on tags in a multi-tenant object storage system. User interface 800 includes window 801, which is an example interface of a user system for administrator 411 to associate ILM policies to different tags. Window 801 presents tags named Gold, Silver, and Bronze like tags 601-603. Window 801 also presents a Default tag. The default tag may be assigned to data buckets/objects when another tag is not or may simply represent a policy that will be used when no tag is assigned. Window 801 indicates that the Default tag is associated with a 1 copy per site storage policy. The Gold tag is associated with an archive after 30 days policy, and the silver tag is associated with an erasure coding policy. Each policy is selected via a dropdown menu listing policy options. The Bronze tag is not yet associated with a policy. Thus, administrator 411 can select the dropdown menu for the Bronze policy and select a policy. In some examples, a new policy may be created if a desired policy is not already located in the dropdown menu. In this case, the description of the Bronze policy indicates that cold storage objects are deleted after 30 days. Assuming that description is correct, administrator 411 will select a policy that enforces the description.

As was the case with user interface 700, some examples may enable a tenant to use an interface like user interface 800 to associate tags with policies. The tenant would not need to rely on administrator 411 to update a policy associated with a tag.

Figure 9:
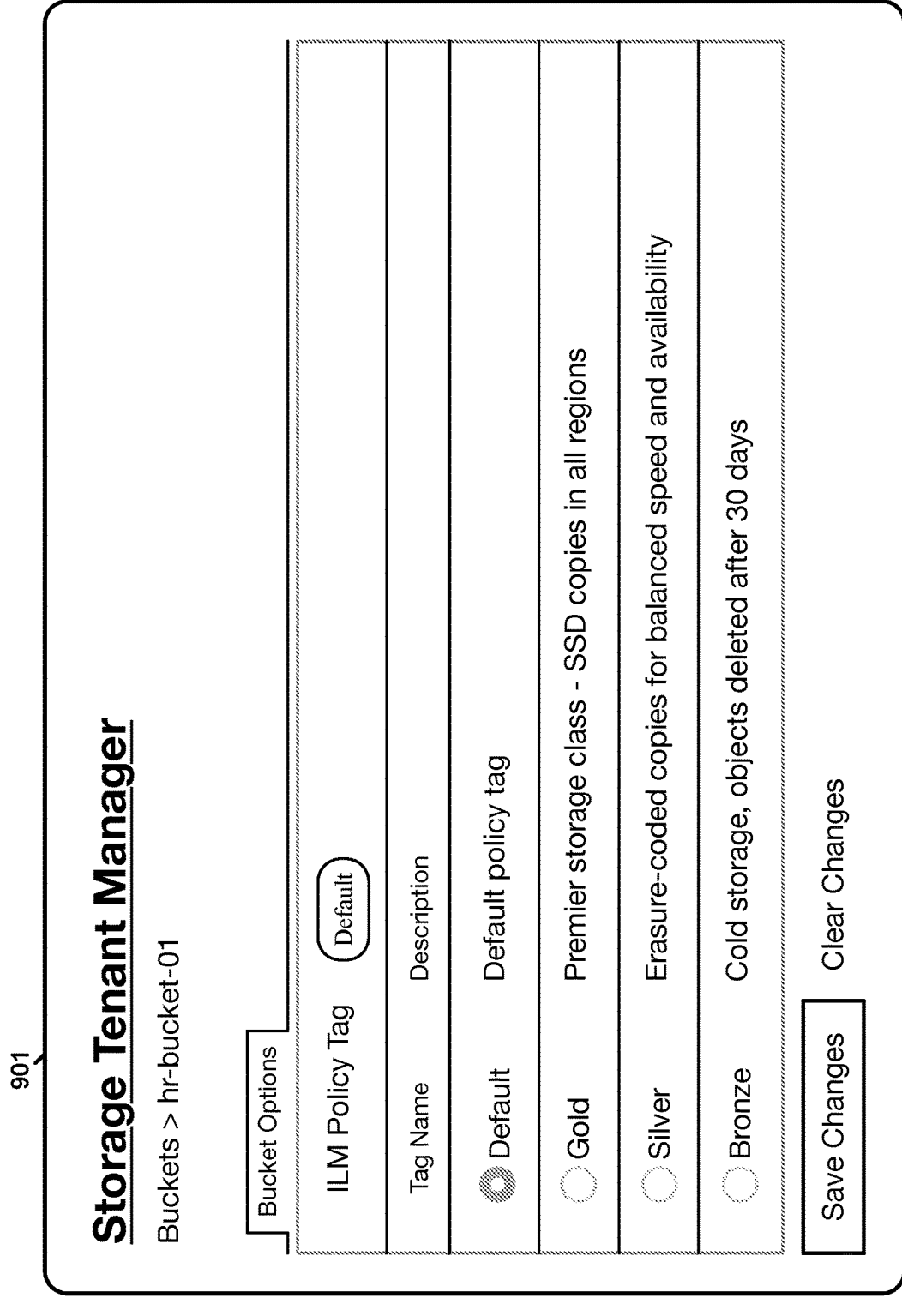
FIG. 9 illustrates a user interface to enforce ILM policies based on tags in a multi-tenant object storage system.

FIG. 9 illustrates user interface 900 to enforce ILM policies based on tags in a multi-tenant object storage system. User interface 900 includes window 901, which is an example interface of a user system for a user (e.g., administrator 411 or a user associated with a tenant) to assign a tag to a particular bucket. In this example, the bucket belongs to the human resources department of a tenant and the tag currently associated with the bucket is the default policy tag. The user may select a radio button next to a different policy tag (e.g., the Gold tag) desired for the bucket and then select save changes or the user may decide to keep things as they are by clearing the changes.

Figure 10:
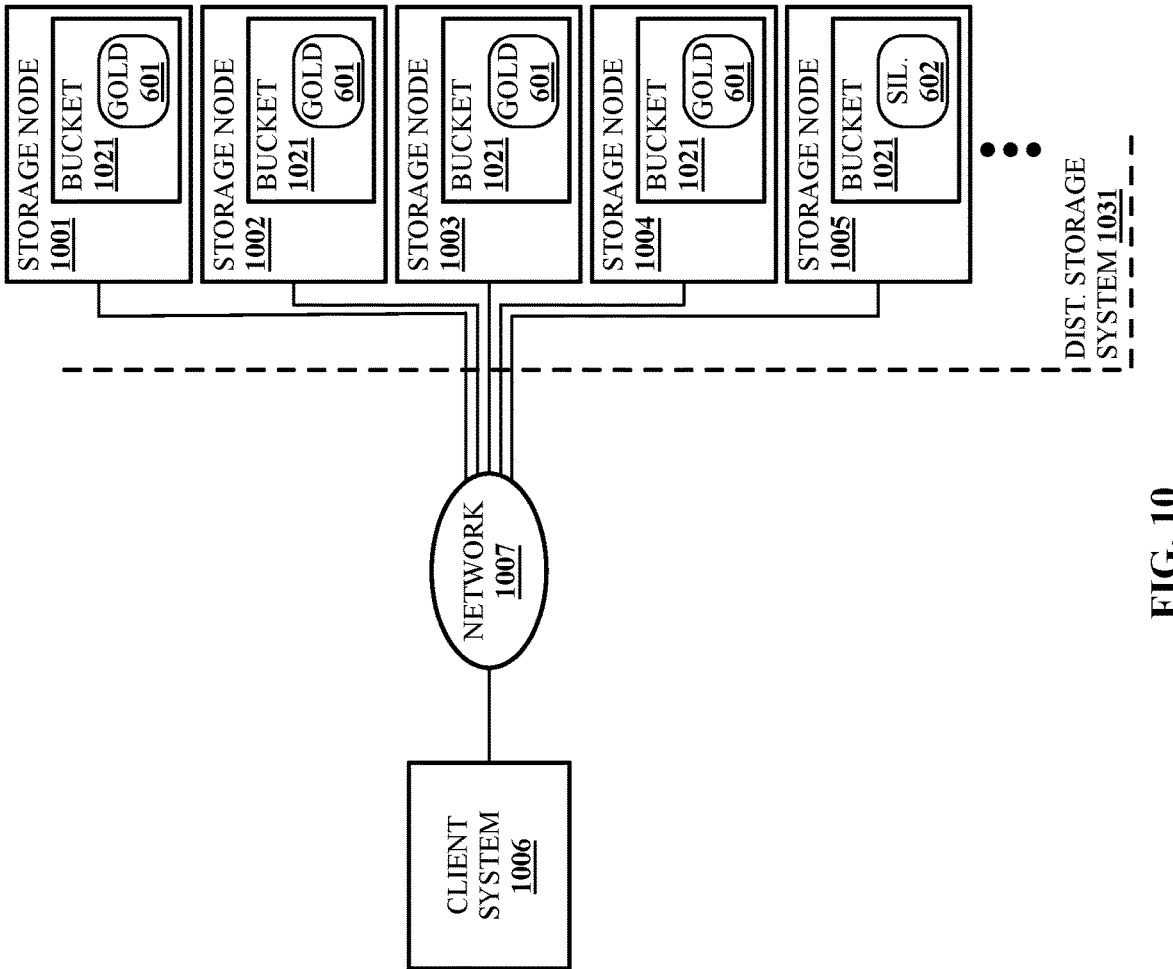
FIG. 10 illustrates an implementation for enforcing ILM policies based on tags in a multi-tenant object storage system.

FIG. 10 illustrates implementation 1000 for enforcing ILM policies based on tags in a multi-tenant object storage system. Implementation 1000 includes storage nodes 1001-1005, which are part of distributed object storage system 1031, client system 1006 and network 1007. Although five nodes are shown in implementation 1000, distributed object storage system 1031 may include more or fewer nodes. Storage nodes 1001-1005 are each positioned at different geographic locations and may include storage media (e.g., hard disk drives or solid-state drives) for storing data, processing circuitry to control the storage and enforce policies, and communication circuitry for communicating over network 1007. Network 1007 includes various communication links, network systems, and network devices for exchanging data communications between storage nodes 1001-1005 and client system 1006. Network 1007 may include one or more local and wide area networks, including the Internet. Client system 1006 is a user system operated by a user to assign tags within distributed object storage system 1031, specifically to bucket 1021. Client system 1006 may also allow for other management activities for distributed object storage system 1031.

Bucket 1021 is stored on storage nodes 1001-1005 and is tagged with an ILM policy tag, as discussed in operational scenario 1100. The term for distributing bucket 1021 across storage nodes 1001-1005 of distributed object storage system 1031 is sharding. Sharding is a technique used to horizontally partition data across multiple servers in a distributed system. It is used to improve the performance and scalability of distributed object storage system 1031 by allowing it to handle more data and more requests. Since bucket 1021 is distributed across so many nodes, there is a chance that tags applied to bucket 1021 may not be consistent across all nodes.

Figure 11:
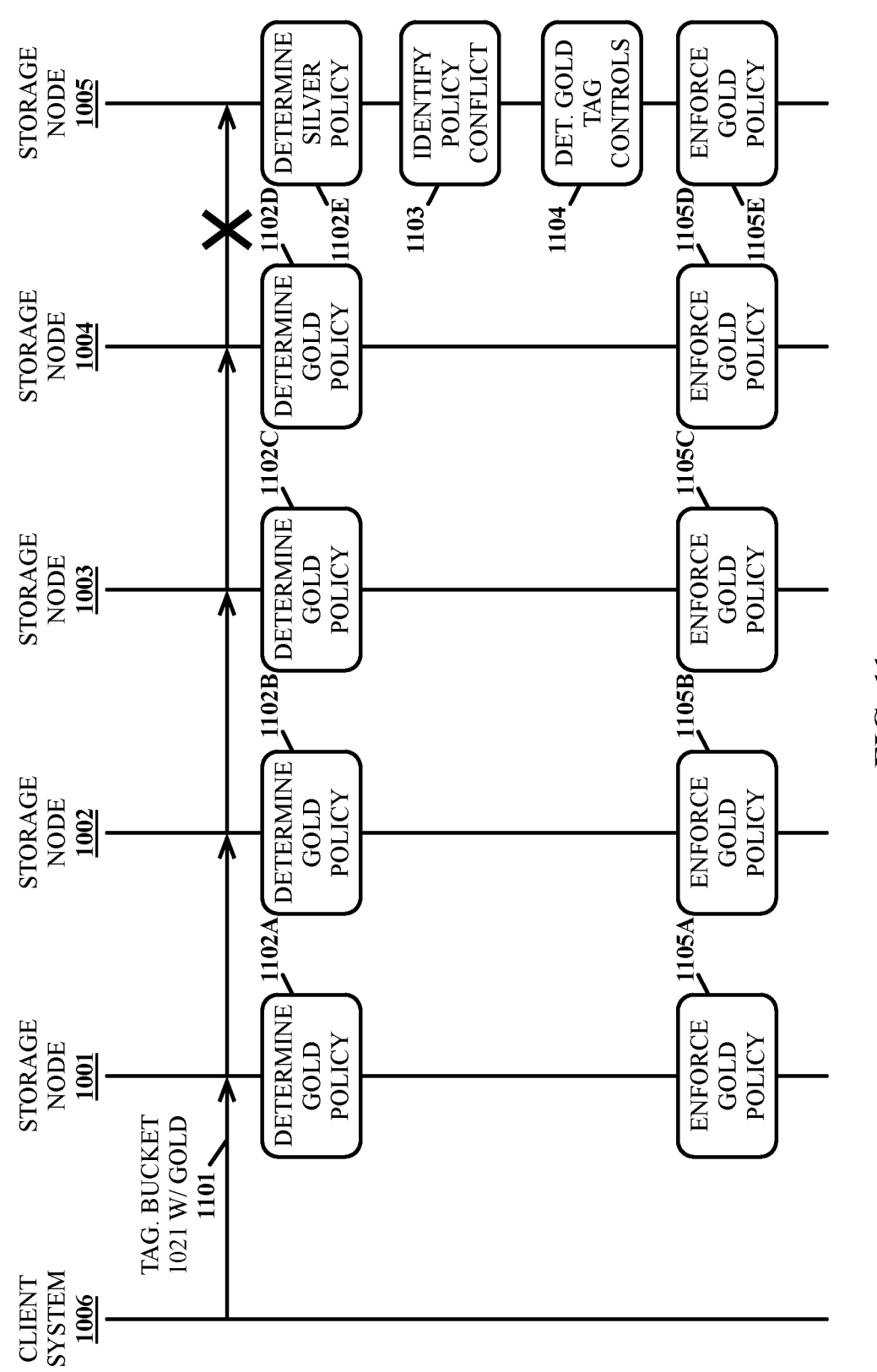
FIG. 11 illustrates an operational scenario for enforcing ILM policies based on tags in a multi-tenant object storage system.

FIG. 11 illustrates operational scenario 1100 for enforcing ILM policies based on tags in a multi-tenant object storage system. Operational scenario 1100 is an example for how tag conflicts may be handled when tags are not consistent across all nodes of distributed object storage system 1031. In operational scenario 1100, client system 1006 transmits an instruction to storage nodes 1001-1005 directing them to assign Gold tag 601 to bucket 1021 (step 1101). The instruction may be sent to each of storage nodes 1001-1005 individually by client system 1006 or client system 1006 may send the message to less than all of storage nodes 1001-1005 and rely on distributed object storage system 1031 to propagate Gold tag 601 between the nodes. For example, client system 1006 may tag bucket 1021 at storage node 1001 and storage node 1001 may handle the propagation of Gold tag 601 to storage nodes 1002-1005. Client system 1006 may display a user interface like user interface 900 to its user enabling the user to select Gold tag 601 from the available tags for bucket 1021. In this example, assigning Gold tag 601 to bucket 1021 replaces silver tag 602 previously assigned to bucket 1021.

Before policy enforcement takes place on bucket 1021, storage nodes 1001-1005 determine which tags are assigned to bucket 1021 (steps 1102A-E). In this example, Gold tag 601 did not propagate to storage node 1005 (e.g., an error may have caused Gold tag 601 not to propagate or the policy enforcement begins prior to Gold tag 601 reaching storage node 1005). Therefore, storage node 1005 at step 1102E determines that bucket 1021 is tagged with silver tag 602 rather than Gold tag 601. Storage nodes 1001-1004 all determined that Gold tag 601 is assigned to bucket 1021. Storage node 1005 determines that a policy conflict exists between storage nodes 1001-1005 storing bucket 1021 (step 1103). Storage node 1005 may communicate with one or more of storage nodes 1001-1004 to determine that silver tag 602 differs from Gold tag 601 or may identify the discrepancy using some other mechanism.

After identifying the conflict, storage node 1005 determines that Gold tag 601 controls and should be used in place of silver tag 602 (step 1104). Storage node 1005 may determine that Gold tag 601 controls based on rules implemented by distributed object storage system 1031. If tag assignments are timestamped, then a rule may indicate that a rule with a more recent timestamp should be used, which is Gold tag 601 in this case. Alternatively, a rule may indicate that a tag applied at a majority of the nodes controls. In another example, a rule may indicate that the stricter of two associated policies should be used (e.g., Gold tag 601 may be associated a more protective policy than silver tag 602). Other types of rules may also be used. After settling on the use of Gold tag 601, the ILM policy associated with Gold tag 601 is enforced on bucket 1021 across all of storage nodes 1001-1005 (steps 1105A-E).

Figure 12:
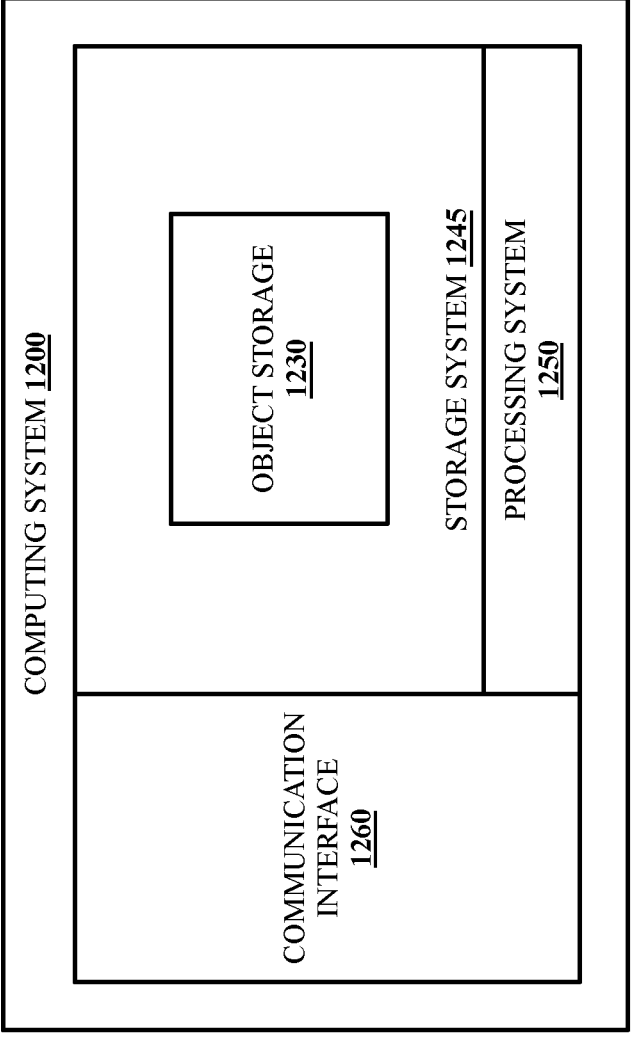
FIG. 12 illustrates a computing system for enforcing ILM policies based on tags in a multi-tenant object storage system.

FIG. 12 illustrates a computing system 1200 or enforcing ILM policies based on tags in a multi-tenant object storage system. Computing system 1200 is representative of any computing system or systems with which the various operational architectures, processes, scenarios, and sequences disclosed herein can be implemented. Computing system 1200 is an example architecture for storage servers 102, storage nodes 1001-1005, and client system 1006, although other examples may exist. Computing system 1200 includes storage system 1245, processing system 1250, and communication interface 1260. Processing system 1250 is operatively linked to communication interface 1260 and storage system 1245. Communication interface 1260 may be communicatively linked to storage system 1245 in some implementations. Computing system 1200 may further include other components such as a battery and enclosure that are not shown for clarity.

Communication interface 1260 comprises components that communicate over communication links, such as network cards, ports, radio frequency (RF), processing circuitry and software, or some other communication devices. Communication interface 1260 may be configured to communicate over metallic, wireless, or optical links. Communication interface 1260 may be configured to use Time Division Multiplex (TDM), Internet Protocol (IP), Ethernet, optical networking, wireless protocols, communication signaling, or some other communication format—including combinations thereof. Communication interface 1260 may be configured to communicate with other computing systems via one or more networks.

Processing system 1250 comprises microprocessor and other circuitry that retrieves and executes operating software from storage system 1245. Storage system 1245 may include volatile and nonvolatile, removable, and non-removable media implemented in any method or technology for storage of information, such as computer readable instructions, data structures, program modules, or other data. Storage system 1245 may be implemented as a single storage device but may also be implemented across multiple storage devices or sub-systems. Storage system 1245 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no interpretations would storage media of storage system 1245, or any other computer-readable storage medium herein, be considered a transitory form of signal transmission (often referred to as "signals per se"), such as a propagating electrical or electromagnetic signal or carrier wave.

Processing system 1250 is typically mounted on a circuit board that may also hold the storage system. The operating software of storage system 1245 comprises computer programs, firmware, or some other form of machine-readable program instructions. The operating software of storage system 1245 comprises object storage module 1230. The operating software on storage system 1245 may further include an operating system, utilities, drivers, network interfaces, applications, or some other type of software. When read and executed by processing system 1250 the operating software on storage system 1245 directs computing system 1200 to network routing advertisements as described herein. Host 1230 may execute natively on processing system 1250 or the operating software may include virtualization software, such as a hypervisor, to virtualize computing hardware on which host 1230 executes.

In at least one example, host 1230 executes on processing system 1250 and directs processing system 1250 to identify Information Lifecycle Management (ILM) policies for an object storage system having multiple tenants, associate respective tags with the ILM policies, enable a subset of the tags to be assigned to data objects of a tenant of the multiple tenants, and enforce a portion of the ILM policies on the data objects, wherein the portion of the ILM policies corresponds to tags of the subset assigned to the data objects.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for enforcing object storage policies using corresponding tags, the method comprising:

identifying Information Lifecycle Management (ILM) policies for an object storage system having multiple tenants, wherein different tenants of the multiple tenants are authorized to use different portions of the ILM policies;

associating respective tags with the ILM policies;

identifying a subset of the tags that correspond to a portion of the ILM policies a tenant of the multiple tenants is authorized to use;

enabling the tenant to assign the subset of the tags to data objects of the tenant in the object storage system, wherein remaining tags of the tags outside of the subset are disabled for assignment by the tenant to the data objects, wherein assignment of a tag of the subset of tags to a data object of the data objects indicates a policy of the ILM policies corresponding to the tag should be used for the data object; and enforcing the portion of the ILM policies on the data objects in accordance with which of the subset of the tags the tenant has assigned to which of the data objects.

2. The method of claim 1, comprising:

identifying a second subset of the tags that correspond to a second portion of the ILM policies a second tenant of the multiple tenants is authorized to use;

enabling the second tenant to assign the second subset of the tags to second data objects of the second tenant in the object storage system, wherein the second subset is different from the subset and corresponds; and enforcing the second portion of the ILM policies on the second data objects in accordance with which of the second subset the second tenant has assigned to which of the second data objects.

3. The method of claim 2, wherein the tenant cannot apply tags of the subset to the second data objects and the second tenant cannot apply tags of the second subset to the data objects.

4. The method of claim 1, wherein enforcing the portion of the ILM policies comprises:

determining a first ILM policy of the ILM policies corresponding to a first tag of the tags assigned to a subject data object of the data objects conflicts with a second ILM policy of the ILM policies corresponding to a second tag of the tags assigned to the subject data object; and determining to apply the first ILM policy to the subject data object when the first ILM policy provides greater data protection than the second ILM policy.

5. The method of claim 1, comprising:

displaying a user interface to an administrator of the object storage system, wherein the user interface displays the tags; and receiving user input from the administrator indicating which tags are available to which of the multiple tenants.

6. The method of claim 1, comprising:

displaying a user interface to an administrator of the object storage system, wherein the user interface displays the tags; and receiving user input from the administrator assigning the tags of the subset to the data objects.

7. The method of claim 1, comprising:

displaying a user interface to a user for the tenant, wherein the user interface displays the subset; and receiving user input from the user assigning the tags of the subset to the data objects.

8. The method of claim 1, comprising:

displaying a user interface to an administrator of the object storage system, wherein the user interface enables creation of tags and associating the tags with ILM policies; and receiving user input from the administrator defining a tag and an associated ILM policy for inclusion in the tags.

9. The method of claim 1, comprising:

during enforcement of the portion of the ILM policies, receiving an updated policy associated with a tag of the subset; and enforcing the updated policy on ones of the data objects having the tag of the subset assigned thereto.

10. The method of claim 1, wherein the tags of the subset assigned to the data objects comprise tags of the subset assigned to one or more buckets including the data objects, wherein the tags of the subset assigned to the one or more buckets take precedence over tags of the subset assigned to a lower level of the object storage system.

11. A system for enforcing object storage policies using corresponding tags, the system comprising:

a set of distributed storage nodes implementing an object storage system having Information Lifecycle Management (ILM) policies available for data objects stored therein, wherein the object storage system distributes the data objects across the distributed storage nodes, wherein the object storage system associates the ILM policies with respective tags, wherein the object storage system determines subsets of the tags corresponding to different portions of the ILM policies available to different tenants of the object storage system, and wherein the object storage system enables a first tenant of the tenants to assign a first subset of the subsets to a first portion of the data objects belonging to the first tenant in the object storage system while those of the tags not in the first subset remain disabled for the first tenant; and a user client system of the first tenant connected to the distributed storage nodes over a communication network, wherein the user client system assigns one or more tags from the first subset to the first portion of the data objects, and wherein the distributed storage nodes enforce the ILM policies on the first portion of the data objects corresponding to the one or more tags assigned to the first portion of the data objects.

12. The system of claim 11, comprising:

a second user client system of a second tenant of the tenants connected to the distributed storage nodes over the communication network, wherein the second tenant is enabled by the data storage system to assign a second subset of the subsets to a second portion of the data objects belonging to the second tenant in the object storage system while those of the tags not in the second subset remain disabled for the second tenant, wherein the second user client system assigns one or more additional tags from the second subset to the second portion of the data objects, wherein at least one of the one or more additional tags is different from the one or more tags and corresponds to a different ILM policy, and wherein the distributed storage nodes enforce the different ILM policies on the second portion of the data objects.

13. The system of claim 12, wherein the one or more tags cannot be applied to the second portion of the data objects and the at least one of the one or more additional tags cannot be applied to the portion of the data objects.

14. The system of claim 11, wherein:

during enforcement of the ILM policies, the distributed storage nodes receive an updated policy associated with a tag of the one or more tags; and the distributed storage nodes enforce the updated policy on ones of the data objects having the tag assigned thereto.

15. An object storage system that enforces object storage policies using corresponding tags, the object storage system comprising:

a plurality of storage nodes configured to:

identify Information Lifecycle Management (ILM) policies for the object storage system having multiple tenants;

associate respective tags with the ILM policies;

identify a subset of the tags that correspond to a portion of the ILM policies a tenant of the multiple tenants is authorized to use;

enable the subset of the tags to be assigned to data objects of the tenant while ones of the tags not included in the subset remain disabled for the tenant, wherein the subset is different from at least one other subset of the tags enabled for at least one other tenant of the multiple tenants; and enforce a portion of the ILM policies on the data objects, wherein the portion of the ILM policies corresponds to tags of the subset assigned to the data objects.

16. The object storage system of claim 15, comprising the plurality of storage nodes configured to:

identify a second subset of the tags that correspond to a second portion of the ILM policies a second tenant of the multiple tenants is authorized to use;

enable the second subset of the tags to be assigned to second data objects of the second tenant while ones of the tags not included in the second subset remain disabled for the second tenant, wherein the second subset is in the at least one other subset; and enforce a second portion of the ILM policies on the second data objects, wherein the second portion of the ILM policies corresponds to tags of the second subset assigned to the second data objects.

17. The object storage system of claim 16, wherein the tenant cannot apply tags of the subset to the second data objects and the second tenant cannot apply tags of the second subset to the data objects.

18. The object storage system of claim 15, wherein to enforce the portion of the ILM policies, the plurality of storage nodes are configured to:

determine a first ILM policy of the ILM policies corresponding to a first tag of the tags assigned to a subject data object of the data objects conflicts with a second ILM policy of the ILM policies corresponding to a second tag of the tags assigned to the subject data object; and determine to apply the first ILM policy to the subject data object when the first ILM policy retains data greater length of time than the second ILM policy.

19. The object storage system of claim 15, wherein an administrator of the object storage system provides user input indicating which of the tags are available to which of the multiple tenants.

20. The object storage system of claim 15, comprising the plurality of storage nodes configured to:

during enforcement of the portion of the ILM policies, receive an updated policy associated with a tag of the subset; and enforce the updated policy on ones of the data objects having the tag of the subset assigned thereto.

21. The object storage system of claim 15, wherein the tags of the subset assigned to the data objects comprise tags of the subset assigned to one or more buckets including the data objects, and wherein the tags of the subset assigned to the one or more buckets take precedence over tags of the subset assigned to a lower level of the object storage system.

* * * * *